United States Patent [19]
Yamamoto et al.

[11] Patent Number: 5,749,062
[45] Date of Patent: May 5, 1998

[54] REFERENCE VALUE CORRECTING DEVICE IN DRIVEN WHEEL SLIP CONTROL SYSTEM

[75] Inventors: Osamu Yamamoto; Shuji Shiraishi, both of Wako; Osamu Yano, Tochigi, all of Japan

[73] Assignee: Honda Giken Kogyo Kabushiki Kaisha, Tokyo, Japan

[21] Appl. No.: 571,799

[22] Filed: Dec. 13, 1995

[30] Foreign Application Priority Data

Dec. 20, 1994 [JP] Japan .................. 6-316477

[51] Int. Cl.$^6$ .................. B60K 28/16
[52] U.S. Cl. .................. 701/72; 701/75; 180/197; 303/139
[58] Field of Search .................. 364/426.016, 426.018, 364/426.019, 426.027, 426.036; 180/197; 303/139, 165

[56] References Cited

U.S. PATENT DOCUMENTS

| | | | |
|---|---|---|---|
| 5,024,285 | 6/1991 | Fujita | 180/197 |
| 5,251,137 | 10/1993 | Chin et al. | 364/426.02 |
| 5,272,636 | 12/1993 | Buschmann et al. | 364/426.02 |
| 5,315,519 | 5/1994 | Chin et al. | 364/426.02 |
| 5,407,023 | 4/1995 | Yamashita et al. | 180/197 |

*Primary Examiner*—Michael Zanelli
*Attorney, Agent, or Firm*—Armstrong, Westerman, Hattori, McLeland & Naughton

[57] ABSTRACT

A reference value for a traction control is calculated based on a vehicle speed. When a vehicle is in a predetermined turning state, so that a driven wheel speed is equal to or lower than a predetermined value and a lateral acceleration is equal to or larger than a predetermined value, a correction value is searched from a table based on the vehicle speed and a steering angle to correct an error of the reference value generated due to a difference between the locus of the driven wheels and the locus of the follower wheels during turning of the vehicle. The reference value is corrected by subtracting the correction value from the reference value (when the vehicle is a rear wheel drive vehicle) or by adding the correction value to the reference value (when the vehicle is a front wheel drive vehicle. Thus, the reference value for the fraction control such as a reference value for a target slip rate can be accurately in accordance with the turning state of the vehicle.

4 Claims, 5 Drawing Sheets

5,749,062

REFERENCE VALUE CORRECTING DEVICE IN DRIVEN WHEEL SLIP CONTROL SYSTEM

BACKGROUND OF THE INVENTION

1. Field of the Invention

The present invention relates to a reference value correcting device in a driven wheel slip control system for estimating a slip state of the driven wheels to control the driving torque by calculating a slip rate of driven wheels, based on a driven wheel speed and a vehicle speed, and comparing the slip rate with a slip-controlling reference value.

2. Description of the Prior Art

Conventionally, a reference value, as a standard for controlling the slipping of the driven wheels, i.e., a reference value determined so that, when the slip rate of the driven wheels exceeds the reference value, the control of the slip of the driven wheels is started, or a reference value to which the slip rate of the driven wheels is converged, is calculated, based on a follower wheel speed (i.e., a vehicle speed).

When, for example, a front wheel steer and rear wheel drive vehicle is in a turning state, the locus of front wheels, as steering and follower wheels, does not coincide with the locus of rear wheels as driven wheels. The locus of the right driven wheel is radially inside the locus of the right follower wheel, and the locus of the left driven wheel is radially inside the locus of the left follower wheel. As a result, the number of rotations of the follower wheels, passing on the radially outer side, is increased, so that the follower wheel speed (vehicle speed) is detected as a larger value, while the number of rotations of the driven wheels, passing on the radially inner side, is decreased so that the driven wheel speed is detected as a smaller value. Therefore, during turning of the vehicle, the reference value, determined in accordance with the follower wheel speed (vehicle speed), is also set as a larger value, and hence, there is a possibility that an appropriate slip control cannot be conducted, unless any correction of the reference value is conducted.

SUMMARY OF THE INVENTION

Accordingly, it is an object of the present invention to accurately determine a reference value as a standard for the control of the slip of the driven wheels even during turning of the vehicle.

To achieve the above object, according to a first aspect and feature of the present invention, there is provided a reference value correcting device, in a driven wheel slip control system, for estimating a slip state of a driven wheel to control a driving torque by calculating a slip rate of the driven wheel, based on a driven wheel speed and a vehicle speed, and by comparing the slip rate with a slip-controlling reference value, the reference value correcting device comprising: a reference value calculating means, for calculating the slip-controlling reference value based on the vehicle speed; a turning-state detecting means for detecting that the vehicle is in a predetermined turning state; a correction value calculating means for calculating a correction value, which corrects the slip-controlling reference value based on the vehicle speed and a steered state, when the vehicle is in the predetermined turning state; and a reference value correcting means for correcting the slip-controlling reference value by the correction value.

With the above arrangement, when the vehicle is in the predetermined turning state, so that the turning radius of the driven wheels is different from the turning radius of the follower wheels, the correction value is calculated, based on the vehicle speed and steered state, and the reference value, for controlling the slip state of the driven wheels, is corrected by the correction value calculated in the above manner. Thus, it is possible to accurately control the slip state of the driven wheels with the suitable reference value even during turning of the vehicle.

According to a second aspect and feature of the present invention, in addition to the first feature, the turning-state detecting means determines that the vehicle is in the predetermined turning state, when a wheel speed is equal to or lower than a predetermined value and the lateral acceleration of the vehicle is equal to or lower than a predetermined value.

With the second feature of the present invention, it is possible to accurately determine the turning state of the vehicle, based on the wheel speed and the lateral acceleration.

According to a third aspect and feature of the present invention, in addition to the first or second feature, when the vehicle is a rear wheel drive vehicle, the reference value correcting means subtracts the correction value from the slip-controlling reference value.

According to a fourth aspect and feature of the present invention, in addition to the first or second feature, when the vehicle is a front wheel drive vehicle, the reference value correcting means adds the correction value to the slip controlling reference value.

With the third or fourth feature of the present invention, when the vehicle is the rear wheel drive vehicle, the correction value is subtracted from the slip-controlling reference value, and when the vehicle is the front wheel drive vehicle, the correction value is added to the slip-controlling reference value. Therefore, it is possible to carry out an appropriate driven wheel slip control in any rear wheel drive vehicle and front wheel drive vehicle.

The above and other objects, features and advantages of the invention will become apparent from the following description of a preferred embodiment taken in conjunction with the accompanying drawings.

DESCRIPTION OF THE PREFERRED EMBODIMENT

The present invention will now be described by way of a preferred embodiment with reference to the accompanying drawings.

Figure 1:
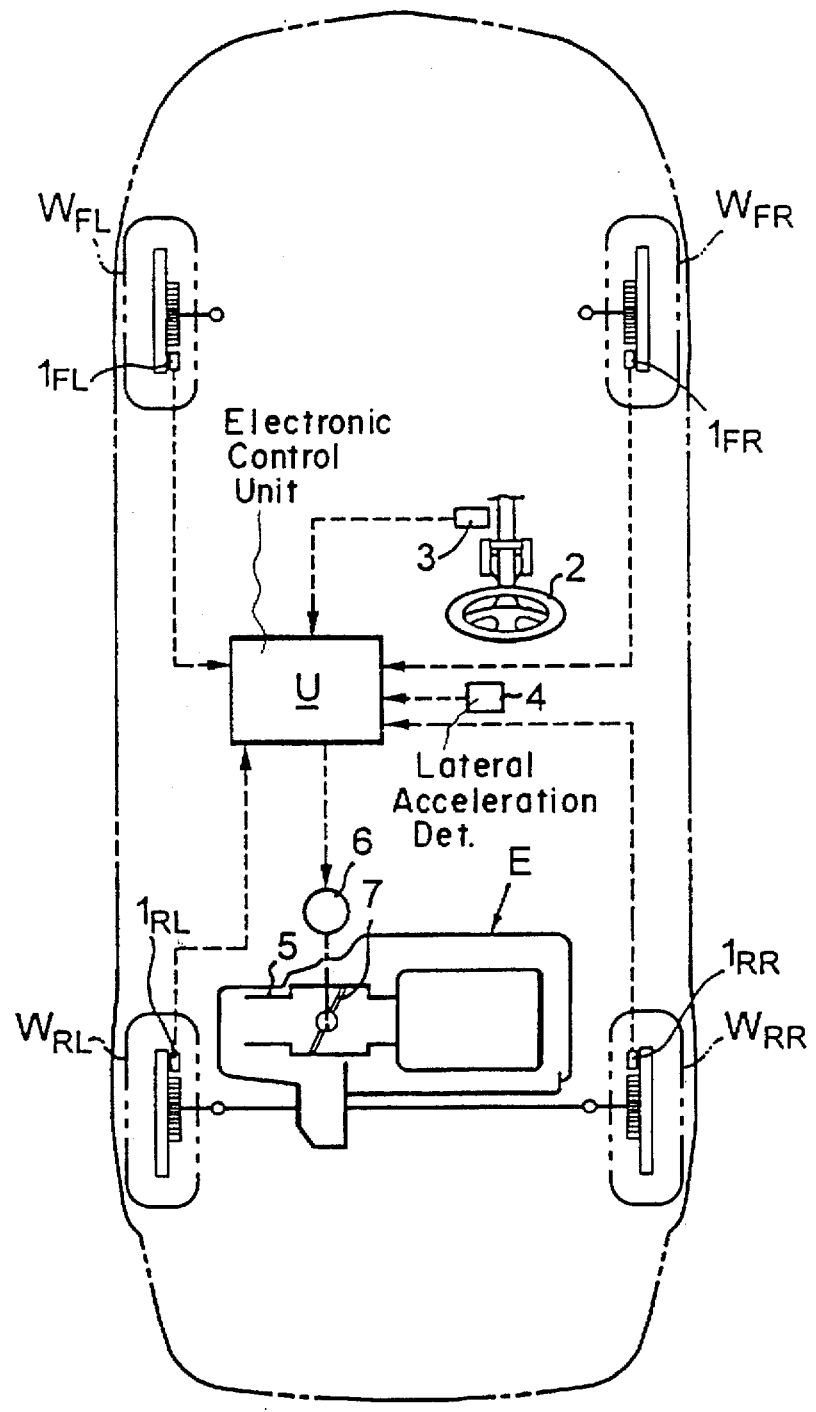
FIG. 1 is a diagrammatic illustration of a vehicle including a traction control system.

FIG. 1 shows a rear wheel drive vehicle which includes a pair of left and right driven wheels $W_{RL}$ and $W_{RR}$ driven by an engine E, and a pair of left and right follower wheels $W_{FL}$ and $W_{FR}$ which are steerable. Driven wheel speed detecting means $1_{RL}$ and $1_{RR}$ are mounted on the driven wheels $W_{RL}$ and $W_{RR}$, respectively, and follower wheel speed detecting means $1_{FL}$ and $1_{RF}$ are mounted on the follower wheels $W_{FL}$ and $W_{RF}$, respectively.

A steering angle detecting means 3, for detecting a steering angle δ, is mounted on a steering wheel 2, and a lateral acceleration detecting means 4, for detecting a lateral acceleration LG, is mounted in place on a vehicle body. A throttle valve 7 is mounted in an intake passage 5 of the engine E and connected to and opened and closed by a pulse motor 6.

The driven wheel speed detector $1_{RL}$ and $1_{RR}$, the follower wheel speed detector $1_{FL}$ and $1_{RL}$ and $1_{RR}$, the angle detector 3, the lateral acceleration detector 4 and the pulse motor 6 are connected to an electronic control unit U including a microcomputer.

In addition to the pulse motor 6, for opening and closing the throttle valve 7, an ignition retarder and fuel cutter (both not shown) are provided in order to reduce the output from the engine E to prevent an excessive slip of the driven wheels $W_{RL}$ and $W_{RR}$.

Figure 2:
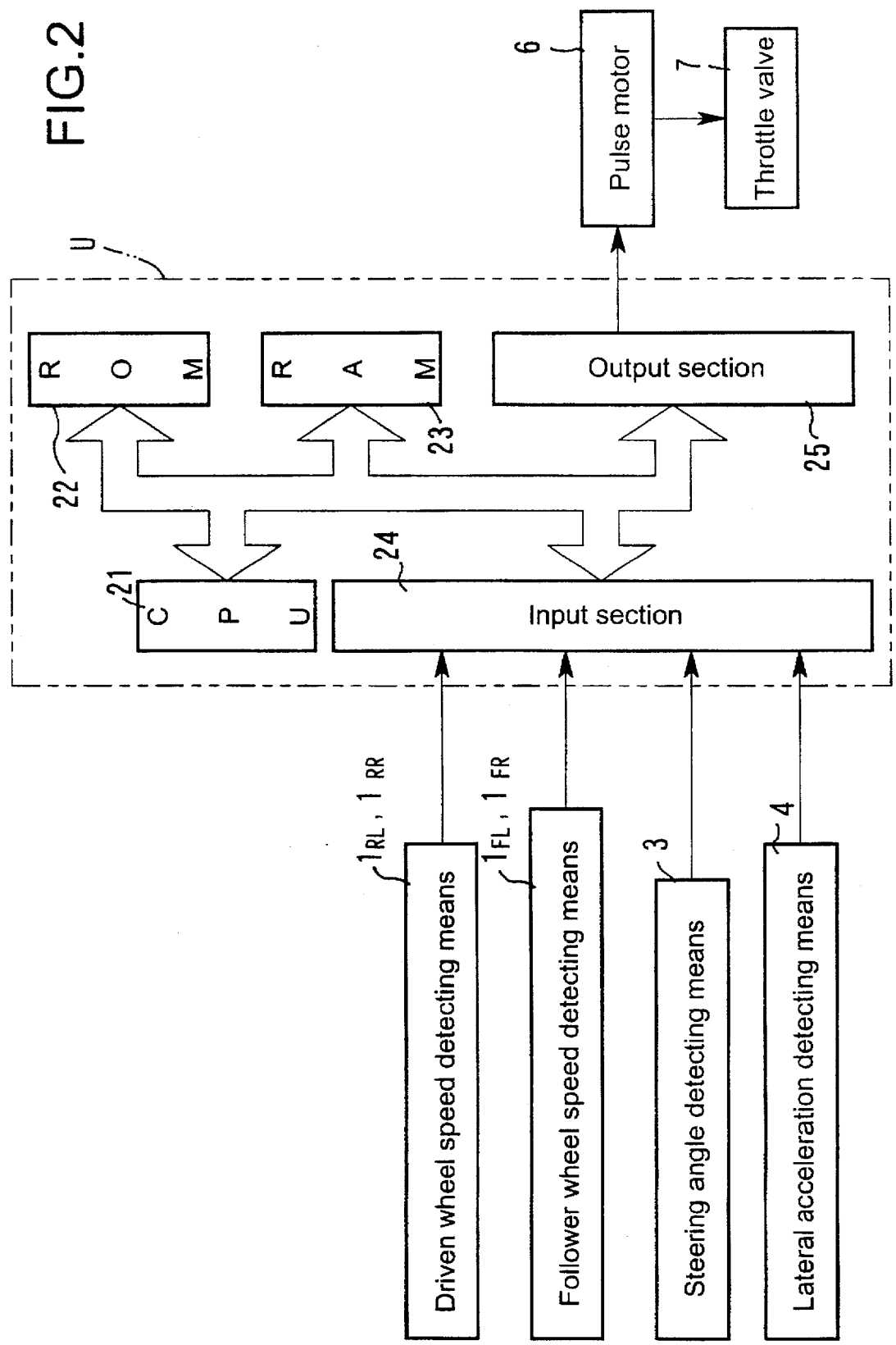
FIG. 2 is a block diagram of a control system.

FIG. 2 shows the electronic control unit U for controlling the output from the engine E by arithmetically processing signals from the various detector, based on a control program and driving the throttle valve 7 by the pulse motor 6, so that when an excessive slip of the driven wheels $W_{RL}$ and $W_{RR}$ has been detected, such excessive slip is inhibited. The electronic control unit U includes a central processing unit (CPU) 21, for conducting the arithmetic processing, a read only memory (ROM) 22, having the control program and data, such as, various maps stored therein, a random access memory (RAM), for temporarily storing the signals from the various detectors and arithmetic results, an input section 24 to which the various detectors, i.e., the driven wheel speed detectors $1_{RL}$ and $1_{RR}$, the follower wheel detectors $1_{RL}$ and $1_{FR}$, the steering angle detectors 3 and the lateral acceleration detector 4 are connected, and an output section 25 to which the pulse motor 6 is connected. Thus, the electronic control unit U arithmetically processes the various signals received through the input section 24, the data stored in the read only memory 22 and the like, based on the control program, which will be described hereinafter, by the central processing unit 21, and finally drives the purse motor 6 through the output section 25. This causes the throttle valve 7 to be controlled to change the output from the engine E, thereby inhibiting the excessive slip of the driven wheels $W_{RL}$ and $W_{RR}$.

Figure 3:
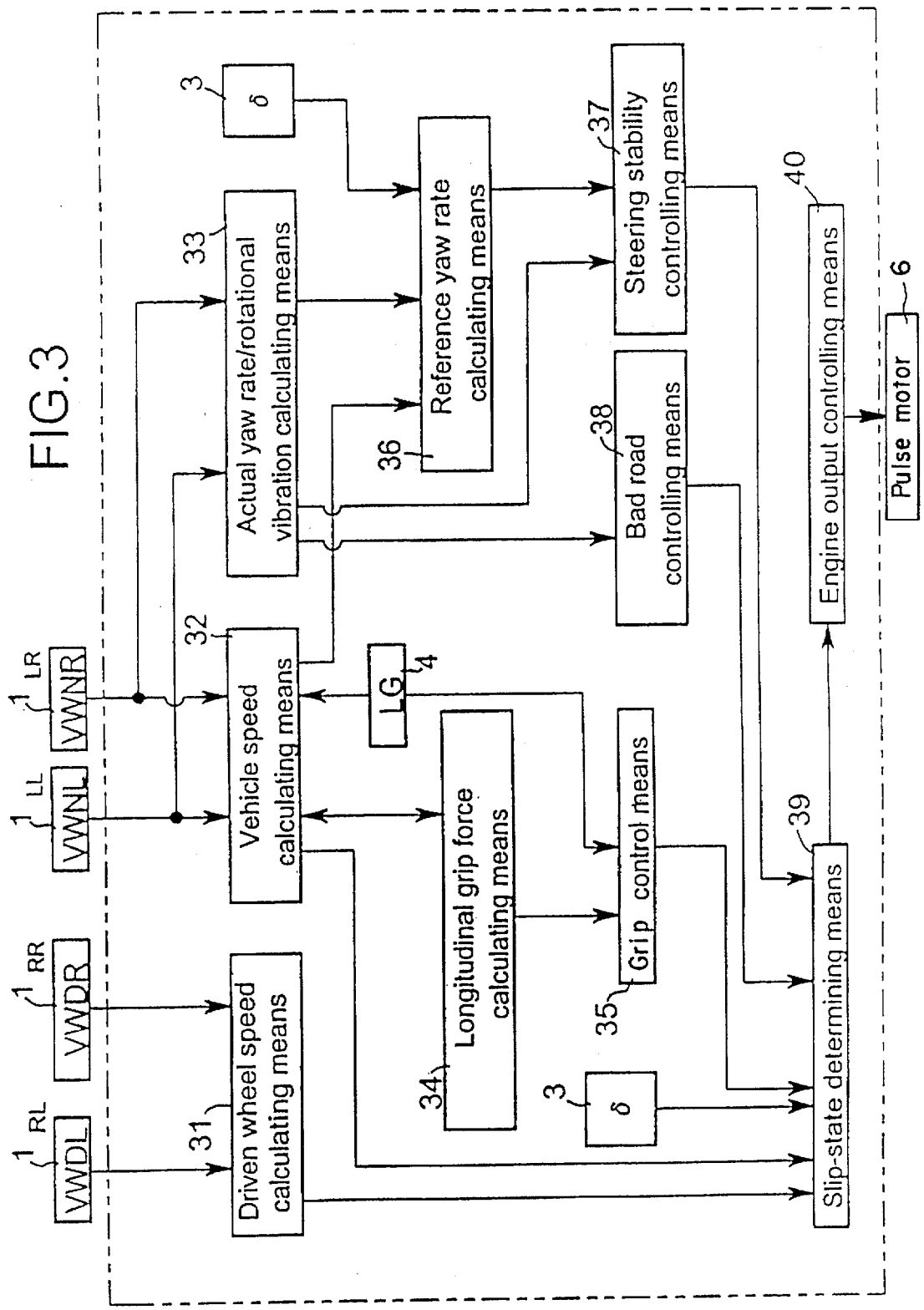
FIG. 3 is a block diagram illustrating a circuit arrangement of an electronic control unit.

The outline of a traction control system will be described below with reference to FIG. 3.

Output signals VWDL and VWDR, from the left and right driven wheel speed detecting means $1_{RL}$ and $1_{RR}$, are supplied to a driven wheel speed calculating means 31, where a driven wheel speed VWNHOS is determined as an average value of the output signals VWDL and VWDR from the driven wheel speed detecting means $1_{RL}$ and $1_{RR}$. In addition, output signals VWNL and VWNR, from the left and right follower wheel speed detecting means $1_{FL}$ and $1_{RF}$, are supplied to a vehicle speed calculating means 32, where a follower wheel speed is determined, as an average value of the output signals VWNL and VWNR from the follower wheel speed detecting means $1_{RL}$ and $1_{FR}$, and defined as a vehicle speed VVN. Further, the output signals VWNL and VWNR, from the left and right follower wheel speed detecting means $1_{FL}$ and $1_{FR}$ are supplied to an actual yaw rate/rotational vibration value calculating means 33, where an actual yaw rate Y and a rotational vibration value Δ V are determined, based on a follower wheel speed difference, which is a deviation between the output signals VWNL and VWNR from the follower wheel speed detecting means $1_{FL}$ and $1_{FR}$.

The vehicle speed VVN, determined in the vehicle speed calculating means 32, is supplied to a longitudinal grip force calculating means 34, where a longitudinal grip force FG is calculated is a time-differentiation value of the vehicle speed VVN.

The longitudinal grip force FG, delivered by the longitudinal grip force calculating means 34 and a lateral acceleration LG of the vehicle, delivered by the lateral acceleration detecting means 4, are supplied to a grip control means 35, where a total grip force TG is determined as a vector sum of the longitudinal grip force FG and the lateral acceleration LG.

A steering angle δ, delivered by the steering angle detecting means 3 and the vehicle speed VVN, delivered by the vehicle speed calculating means 32, are supplied to a reference yaw rate calculating means 36, where a reference yaw rate $Y_{REF}$, which is a yaw rate to be intrinsically generated by the vehicle in accordance with the operational state, is calculated. The reference yaw rate $Y_{REF}$, delivered by the reference yaw rate calculating means 36 and the actual yaw rate Y, delivered by the actual yaw rate/rotational vibration value calculating means 33, are supplied to a steering stability control means 37, where it is determined whether the vehicle is in an over-steered state or in an under-steered state.

The rotational vibration value Δ V delivered by the actual yaw rate/rotational vibration value calculating means 33, is supplied to a bad-road control means 38, where it is determined, based on the magnitude of the rotational vibration value Δ V, whether a road on which the vehicle is now traveling is a bad road.

The driven wheel speed VWNHOS, delivered by the driven wheel speed calculating means 31, and the vehicle speed VVN delivered by the vehicle speed calculating means 32, are supplied to a slip-state determining means 39, where a slip rate of the driven wheels $W_{RL}$ and $W_{RR}$, calculated from the driven wheel speed VWNHOS and the vehicle speed VVN, is compared with a reference value VR, (which will be described hereinafter) determined from the vehicle speed VVN. Depending upon the result of such comparison, the pulse motor 6 drives the throttle valve 7 to control the output from the engine E.

In this case, the reference value VR is corrected in accordance with the total grip force TG, delivered by the grip control means 35, the steered state, delivered by the steering stability control means 37, and the road surface condition, delivered by the bad-road control means 38.

More specifically, when the total grip force TG is large, the reference value VR is corrected to a large value, whereby a sporty travel is possible without damaging of a slip control function for the driven wheels $W_{FL}$ and $W_{FR}$. Even in the case of a bad road on which the driven wheels are difficult to slip, the reference value is corrected to a large value. Further, this vehicle is the rear wheel drive vehicle and hence, when the vehicle is in an over-steered state, the reference value VR is corrected to a smaller value, and when the vehicle is in an under-steered state, the reference value VR is corrected to a larger value, thereby preventing the vehicle from turning in a undesirable direction.

When the vehicle is a predetermined turning state, the follower wheel speed VVNHOS (i.e., the vehicle speed) is detected as a larger value, because the follower wheels $W_{FL}$ and $W_{FR}$ which are steering wheels, have a larger turning radius, and the driven wheel speed VWNHOS is detected as a smaller value, because the driven wheels $W_{RL}$ and $W_{RR}$ have a smaller turning radius. As a result, during turning of the vehicle, the reference value VR, determined in accordance with the vehicle speed VVN, is set as a larger value and for this reason, it is necessary, dependent upon the turning state of the vehicle, to effect the correction of the reference value. The correction of the reference value VR, based on the turning of the vehicle, will be described in detail hereinafter with reference to FIGS. 4 and 5.

The output from the engine E is reduced, by driving the pulse motor 6 by the engine output control means 40 to regulate the opening degree of the throttle valve 7, based on a corrected reference value VR' delivered by the slip-state determining means 39. As a result, the slip rate of the driven wheels $W_{RL}$ and $W_{RR}$ is converged to a desired value, whereby the excessive slip of the driven wheels $W_{RL}$ and $W_{RR}$ is inhibited.

The reference value correcting function of the slip state determining means 39, shown in the block diagram in FIG. 3, will be described in detail with reference to the block diagram in FIG. 4 and the flow chart in FIG. 5.

Figure 4:
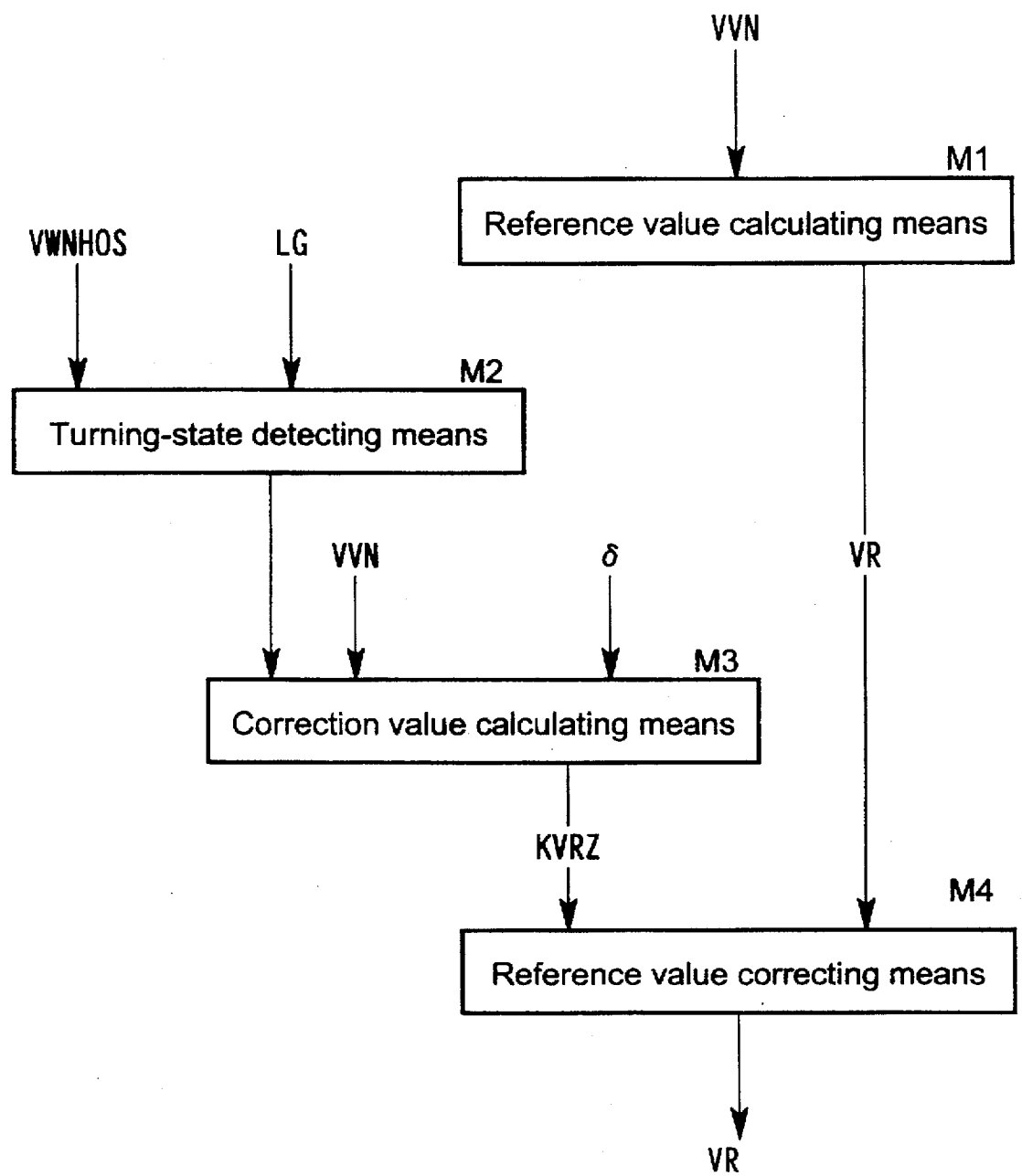
FIG. 4 is a block diagram of a slip-state determining means.
Figure 5:
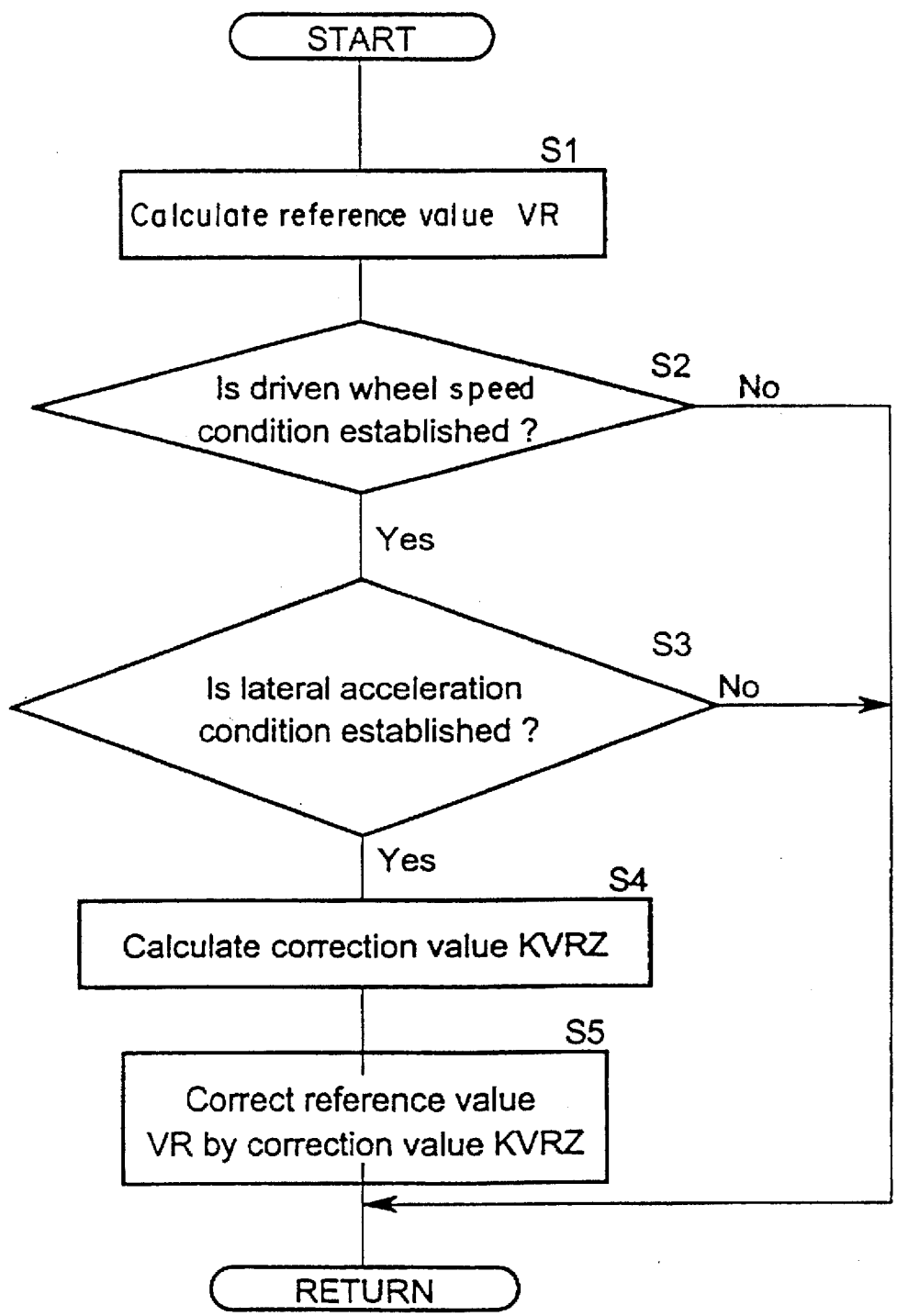
FIG. 5 is a flow chart for correcting the reference value.

First, in the reference value calculating means M1, FIG. 4, a reference value VR is calculated, based on the vehicle speed VVN (at step S1, FIG. 5). The reference value VR includes a reference value VR1 determined so that, when the slip rate SLIPR (SLIPR=(VWNHOS−VVN)/VWNHOS) of the driven wheels $W_{RL}$ and $W_{RR}$ exceeds the reference value VR1, the fraction control by the throttle valve 7 is started; a reference value VRP, which is a target value to which the slip rate SLIPR of the driven wheels $W_{RL}$ and $W_{RR}$ is converged; and a reference value VR2, determined so that when the slip rate SLIPR of the driven wheels $W_{RL}$ and $W_{RR}$ exceeds the reference value VR2, the traction control by the ignition retarding, or the fuel-cutting, is started (VR1<VRP<VR2). Any of these reference values is increased linearly with an increase in vehicle speed VVN.

In the turning-state detecting means M2, it is determined whether the driven wheel speed VWNHOS is equal to, or lower than, 60 km/hr (at step S2, FIG. 5). If the answer at step S2 is YES and VWNHOS<60 km/hr, it is determined whether the lateral acceleration LG is equal to, or lower than, 0.3 G (at step S3). When the conditions at steps S2 and S3 are established, it is determined that the vehicle is in a predetermined turning state, and the correction of the reference value VR is carried out at steps S4 and S5.

If the answer at step S2 is NO, this means that the vehicle speed is high, so that the turning locus of the driven wheels $W_{RL}$ and $W_{RR}$ substantially coincides with the turning locus of 12 the follower wheels $W_{FL}$ and $W_{FR}$. If the answer at step S3 is NO, this means that the vehicle is turning slowly, so that the turning locus of the driven wheels $W_{RL}$ and $W_{RR}$ substantially coincides with the turning locus of the follower wheels $W_{FL}$ and $W_{FR}$. In such cases, the correction of the reference value VR, based on the turning of the vehicle, is not carried out.

If it is determined that the vehicle is in the predetermined turning state, a correction value KVRZ is searched from a table stored in the read only memory 22, FIG. 2, based on the vehicle speed VVN and the steering angle δ in the correction value calculating means M3, FIG. 4, (at step S4). And the correction value KVRZ is subtracted from the reference value VR in the reference correcting means M4, FIG. 4, to calculate a final reference value VR' (at step S5).

In this manner, it is possible to carry out an appropriate traction control even during turning of the vehicle, by determining the final reference value VR' in consideration of a difference between the turning locus of the driven wheels $W_{RL}$ and $W_{RR}$ and the turning locus of the following wheels $W_{FL}$ and $W_{FR}$ based on the turning of the vehicle.

Although the embodiment of the present invention has been described in detail, it will be understood that the present invention is not limited to the above-described embodiment, and various modifications in design may be made without departing from the spirit and scope of the invention defined in the claims.

For example, the rear wheel drive vehicle has been illustrated in the embodiment, but the present invention is applicable to a front wheel drive vehicle. In this case, the vehicle speed VVN is detected as a smaller value and hence, the correction value KVRZ can be added to the reference value VR to determine a final reference value VR'. In addition, the steering angle δ, which is a parameter in searching the correction value VRZ from the table, can be determined from the actual yaw rate Y, in place of being determined from the output from the steering angle detecting means 3.

What is claimed is:

1. A reference value correcting device in a driven wheel slip control system for estimating a slip state of a driven wheel to control a driving torque by calculating a slip rate of the driven wheel, based on a driven wheel speed and a vehicle speed, and by comparing said slip rate with a slip-controlling reference value, said reference value correcting device comprising:

a reference value calculating means for calculating the slip-controlling reference value based on said vehicle speed; a turning-state detecting means for detecting that the vehicle is in a predetermined turning state;

a correction value calculating means for calculating a correction value which corrects the slip-controlling reference value based on the vehicle speed and a steered state, when the vehicle is in the predetermined turning state; and a reference value correcting means for correcting said slip-controlling reference value by said correction value.

2. A reference value correcting device in a driven wheel slip control system according to claim 1, wherein said turning-state detecting means determines that the vehicle is in the predetermined turning state, when a wheel speed is equal to or lower than a predetermined value and a lateral acceleration of the vehicle is equal to or lower than a predetermined value.

3. A reference value correcting device in a driven wheel slip control system according to claim 1 or 2, wherein said vehicle is a rear wheel drive vehicle, and said reference value correcting means subtracts said correction value from said slip-controlling reference value.

4. A reference value correcting device in a driven wheel slip control system according to claim 1 or 2, wherein said vehicle is a front wheel drive vehicle, and said reference value correcting means adds said correction value to said slip controlling reference value.

* * * * *